United States Patent
Yoo et al.

(10) Patent No.: US 12,395,728 B2
(45) Date of Patent: Aug. 19, 2025

(54) METHOD AND APPARATUS FOR DETECTING BEST SHOT IN LONG-RANGE FACE RECOGNITION SYSTEM

(71) Applicant: ELECTRONICS AND TELECOMMUNICATIONS RESEARCH INSTITUTE, Daejeon (KR)

(72) Inventors: Jang-Hee Yoo, Daejeon (KR); Cheolhwan Yoo, Daejeon (KR); ByungOk Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 99 days.

(21) Appl. No.: 18/488,348

(22) Filed: Oct. 17, 2023

(65) Prior Publication Data

US 2024/0196086 A1    Jun. 13, 2024

(30) Foreign Application Priority Data

Dec. 9, 2022 (KR) .......... 10-2022-0171301

(51) Int. Cl.
| | |
|---|---|
| H04N 7/18 | (2006.01) |
| G06T 7/00 | (2017.01) |
| G06V 20/40 | (2022.01) |
| G06V 40/16 | (2022.01) |
| H04N 23/60 | (2023.01) |
| G06V 20/52 | (2022.01) |

(52) U.S. Cl.
CPC ........... *H04N 23/64* (2023.01); *G06T 7/0002* (2013.01); *G06V 20/41* (2022.01); *G06V 40/165* (2022.01); *G06V 40/172* (2022.01); *H04N 7/183* (2013.01); *G06T 2207/10016* (2013.01); *G06T 2207/30168* (2013.01); *G06T 2207/30201* (2013.01); *G06T 2207/30232* (2013.01); *G06V 20/52* (2022.01)

(58) Field of Classification Search
CPC ...... H04N 23/64; H04N 7/183; G06V 40/165; G06V 40/172; G06V 20/41; G06V 20/52; G06T 7/0002; G06T 2207/10016; G06T 2207/30168; G06T 2207/30201; G06T 2207/30232
USPC .......................................... 348/143
See application file for complete search history.

(56) References Cited

U.S. PATENT DOCUMENTS

| | | | | |
|---|---|---|---|---|
| 8,139,817 | B2 * | 3/2012 | Laganiere | G06V 40/16 382/118 |
| 9,014,475 | B2 | 4/2015 | Hara | |
| 9,195,883 | B2 * | 11/2015 | Brewer | G06V 20/52 |
| 10,515,457 | B2 * | 12/2019 | Saito | G06V 40/165 |

(Continued)

FOREIGN PATENT DOCUMENTS

KR    10-0676408 B1    1/2007

*Primary Examiner* — Trang U Tran
(74) *Attorney, Agent, or Firm* — LRK PATENT LAW FIRM

(57) ABSTRACT

A method and apparatus for detecting the best shot in a long-range face recognition system is provided. The method of detecting the best shot includes detecting a facial area in an image received from the outside, calculating a quality element measurement value of the face image by analyzing the facial area, and selecting a best shot face image, among the detected facial areas, based on the quality element measurement value.

8 Claims, 4 Drawing Sheets

(56) References Cited

U.S. PATENT DOCUMENTS

| | | |
|---|---|---|
| 10,691,925 B2 * | 6/2020 | Ng .................... G06N 5/046 |
| 2020/0167583 A1 | 5/2020 | Yoon et al. |
| 2022/0129689 A1 | 4/2022 | Kim et al. |

* cited by examiner

METHOD AND APPARATUS FOR DETECTING BEST SHOT IN LONG-RANGE FACE RECOGNITION SYSTEM

CROSS-REFERENCE TO RELATED APPLICATION

This application claims priority to and the benefit of Korean Patent Application No. 10-2022-0171301, filed on Dec. 9, 2022, the disclosure of which is incorporated herein by reference in its entirety.

BACKGROUND

1. Technical Field

The present disclosure relates to a method and apparatus for detecting a face in an image.

2. Description of Related Art

A face recognition technology which is basically used in a biometrics system based on a front face image in a limited environment is applied to very various application systems, such as search for a criminal and search for a missing child through long-range face recognition or human re-identification in a CCTV environment in combination with the deep neural network technology.

For example, such an application system may provide the results of search through a matching process with a watch list by immediately transmitting a face detected through a CCTV camera to a face recognition system. Furthermore, the application system may fully detect and track the face until the face disappears after appearing in the field of view (FoV) of the CCTV camera, may define an image having the best quality, among images of the detected and tracked face, as the best shot, may transmit the best shot to the face recognition system, and may provide the retrieved results through matching.

However, a conventional long-range face recognition technology has a problem in that when a face is detected and immediately transmitted, many computing resources are required due to frequent search queries along with low search performance because the quality of an image of the detected face is not guaranteed or if one best shot having the best quality is transmitted, the results of search are provided after a face disappears from a CCTV camera although search performance having a relatively high level is provided. Furthermore, in some cases, the quality of an input face image that is most important in face recognition is not guaranteed because the measurement of quality elements and a criterion for the quality elements, which are limited regardless of an object and environment of a face recognition system and are the same, are used. Accordingly, this becomes a cause to degrade recognition performance.

SUMMARY

Various embodiments are directed to providing a method and apparatus for detecting the best shot in a long-range face recognition system, which measure important quality elements of a face image that is detected for face recognition through resolution analysis, focus analysis, pose analysis, and illumination analysis in the long-range face recognition system, select a face image that satisfies a set quality element reference value as the best shot, and perform the face recognition based on the selected best shot, in order to solve the problems of the conventional technology and improve performance of a long-range face recognition system.

Objects of the present disclosure are not limited to the aforementioned object, and other objects not described above may be evidently understood by those skilled in the art from the following description.

A best shot detection apparatus according to an embodiment of the present disclosure includes a face image detection module configured to detect a facial area in an input image, a quality element measurement module configured to calculate a quality element measurement value of the facial area by analyzing the facial area, and a best shot selection module configured to select a best shot face image, among the detected facial areas, based on the quality element measurement value.

In an embodiment of the present disclosure, the best shot selection module may calculate a quality index of the facial area based on the quality element measurement value, and may select the best shot face image, among the detected facial areas each having a quality index equal to or greater than a preset reference value.

In an embodiment of the present disclosure, the best shot selection module may transmit the best shot face image to a face recognition apparatus.

In an embodiment of the present disclosure, the best shot selection module may determine the best shot face image to be transmitted to the face recognition apparatus based on the number of best shot face images of an identical person.

In an embodiment of the present disclosure, the best shot selection module may determine whether to transmit the best shot face image to the face recognition apparatus based on a quality index of the best shot face image.

In an embodiment of the present disclosure, the quality element measurement value may include any one of a resolution value, a focus element measurement value, a pose element measurement value, and an illumination element measurement value or a combination of the resolution value, the focus element measurement value, the pose element measurement value, and the illumination element measurement value.

In an embodiment of the present disclosure, the quality element measurement module may calculate the focus element measurement value by analyzing a high frequency component of the facial area.

In an embodiment of the present disclosure, the quality element measurement module may calculate the pose element measurement value by analyzing a difference between a front face and three-dimensional angle of the facial area.

In an embodiment of the present disclosure, the quality element measurement module may calculate the illumination element measurement value by analyzing a brightness histogram of the facial area.

Furthermore, a face recognition system according to an embodiment of the present disclosure includes the best shot detection apparatus and a face recognition apparatus configured to perform face recognition based on the best shot face image.

Furthermore, a method of detecting the best shot according to an embodiment of the present disclosure includes detecting a face image in an image received from the outside, calculating a quality element measurement value of the face image by analyzing the face image, and selecting a best shot face image, among the detected face images, based on the quality element measurement value.

In an embodiment of the present disclosure, the selecting of the best shot face image may include calculating a quality index of the face image based on the quality element measurement value, determining whether the quality index is equal to or greater than a preset quality index reference value, and selecting the face image as the best shot face image when the quality index is equal to or greater than the reference value.

In an embodiment of the present disclosure, the selecting of the best shot face image may include transmitting the best shot face image to a face recognition apparatus.

In an embodiment of the present disclosure, the selecting of the best shot face image may include determining the best shot face image to be transmitted to the face recognition apparatus based on the number of best shot face images of an identical person.

In an embodiment of the present disclosure, the selecting of the best shot face image may include determining whether to transmit the best shot face image to the face recognition apparatus based on a quality index of the best shot face image.

In an embodiment of the present disclosure, the quality element measurement value may include any one of a resolution value, a focus element measurement value, a pose element measurement value, and an illumination element measurement value or a combination of the resolution value, the focus element measurement value, the pose element measurement value, and the illumination element measurement value.

In an embodiment of the present disclosure, the calculating of the quality element measurement value may include calculating the focus element measurement value by analyzing a high frequency component of the face image.

In an embodiment of the present disclosure, the calculating of the quality element measurement value may include calculating the pose element measurement value by analyzing a difference between a front face and three-dimensional angle of the face image.

In an embodiment of the present disclosure, the calculating of the quality element measurement value may include calculating the illumination element measurement value by analyzing a brightness histogram of the face image.

In an embodiment of the present disclosure, the detecting of the face image may include generating the face image by detecting a facial area in the image received from the outside, and identifying a face image of an identical person in the face image based on the results of the tracking of the facial area detected in a video image when the image received from the outside is the video image.

The embodiments of the present disclosure have effects in that various quality indices can be calculated by measuring quality elements of a face image that is detected in a long-range face recognition system through resolution analysis, focus analysis, pose analysis, and illumination analysis and performance of the face recognition system can be greatly improved by efficiently detecting the best shot face image based on the quality indices.

That is, according to the embodiments of the present disclosure, a valid best shot can be detected in real time and performance of a face recognition system can be significantly improved, by calculating various quality indices of a detected face image, setting a best shot detection criterion suitable for an object and environment of the face recognition system based on the quality indices, selecting the best shot face image, based on the set detection criterion, and scheduling the transmission of the best shot based on the number of best shots selected.

Effects which may be obtained in the present disclosure are not limited to the aforementioned effects, and other effects not described above may be evidently understood by a person having ordinary knowledge in the art from the following description.

DETAILED DESCRIPTION

Figure 1:
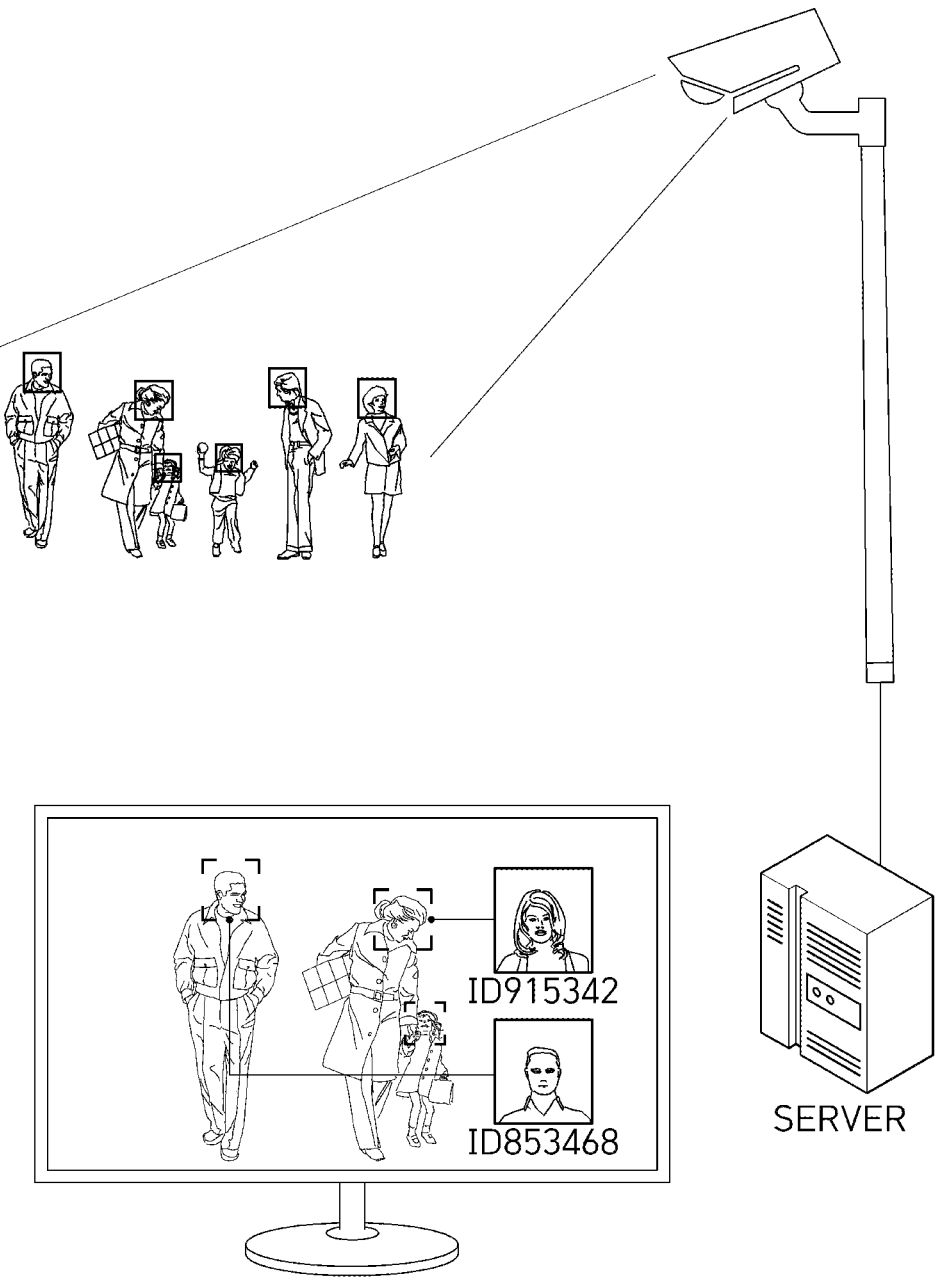
FIG. 1 is a concept view of a face recognition system according to an embodiment of the present disclosure.

The present disclosure relates to a method and apparatus for detecting the best shot, for obtaining a face image having high quality in a long-range face recognition system. The present disclosure relates to a method and apparatus for detecting the best shot, which measure quality elements of a detected face image through resolution analysis, focus analysis, pose analysis, and illumination analysis, select the best shot face image by determining whether a measurement value of the quality element satisfies a predetermined criterion, and transmit the best shot face image to a face recognition system. Specifically, the method and apparatus for detecting the best shot according to an embodiment of the present disclosure set a reference value (or a threshold value) capable of satisfying each of weights and qualities of quality elements, such as resolution, a focus, a pose, and illumination of a detected face image by considering an object or recognition environment of the face recognition system, and detect the best shot which can be directly used in face recognition when the detected face image satisfies the set reference value.

Advantages and characteristics of the present disclosure and a method for achieving the advantages and characteristics will become apparent from the embodiments described in detail later in conjunction with the accompanying drawings. However, the present disclosure is not limited to the disclosed embodiments, but may be implemented in various different forms. The embodiments are merely provided to complete the present disclosure and to fully notify a person having ordinary knowledge in the art to which the present disclosure pertains of the category of the present disclosure. The present disclosure is merely defined by the claims. Terms used in this specification are used to describe embodiments and are not intended to limit the present disclosure. In this specification, an expression of the singular number also includes an expression of the plural number unless clearly defined otherwise in the context. The term "comprises" and/or "comprising" used in this specification does not exclude the presence or addition of one or more other components, steps, operations and/or elements in addition to mentioned components, steps, operations and/or elements.

When it is described that one component is "connected" or "coupled" to the other component, it should be understood that one component may be directly connected or coupled to the other component, but a third component may exist between the two components. In contrast, when it is described that one component is "directly connected to" or "directly coupled to" the other component, it should be understood that a third component does not exist between the two components. Other expressions for describing relations between components, that is, "between ~", "just between ~", "adjacent to ~", and "neighboring ~" should be likewise construed.

In describing the present disclosure, a detailed description of a related known technology will be omitted if it is deemed to make the subject matter of the present disclosure unnecessarily vague.

Hereinafter, embodiments of the present disclosure are described in detail with reference to the accompanying drawings. In describing the present disclosure, in order to facilitate general understanding of the present disclosure, the same reference numeral is used for the same mean regardless of the reference numeral.

FIG. 1 is a concept view of a face recognition system according to an embodiment of the present disclosure. Specifically, FIG. 1 illustrates is a concept view of a face recognition system 10 that detects a face image in an image captured by a CCTV camera at a remote place, which is connected to the face recognition system 10 over a network, and that recognizes a face based on the detected face image.

The face recognition system 10 according to an embodiment of the present disclosure includes a face image detection module 110 configured to receive an image captured by a CCTV camera at a remote place, which is connected to the face recognition system 10 over a network, and to detect a face in the received image, a quality element measurement module 120 configured to measure the quality of an image of the detected face, a best shot selection module 130 configured to select the best shot face image based on the measured quality element and to transmit the best shot face image to a face recognition apparatus 200, and the face recognition apparatus 200, that is, a server that performs face recognition based on the best shot face image.

Figure 2:
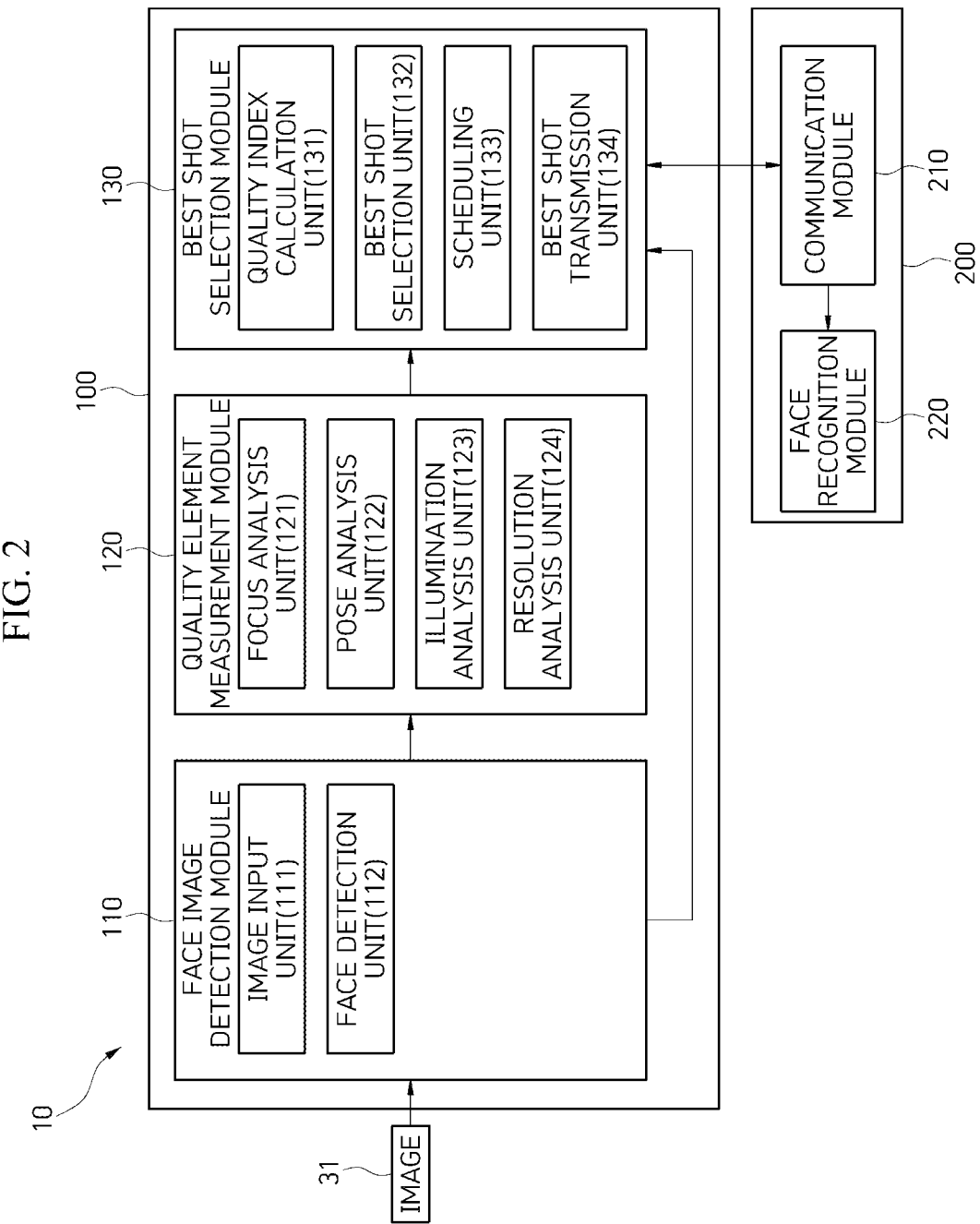
FIG. 2 is a block diagram illustrating a construction of an apparatus for detecting the best shot and a face recognition system including the apparatus according to an embodiment of the present disclosure.

FIG. 2 is a block diagram illustrating a construction of an apparatus for detecting the best shot and the face recognition system including the apparatus according to an embodiment of the present disclosure.

The face recognition system 10 according to an embodiment of the present disclosure recognizes a face included in an image 31, based on the image 31. The face recognition system 10 includes a best shot detection apparatus 100 and a face recognition apparatus 200.

For example, the image 31 may be an image captured by a CCTV camera at a remote place. Furthermore, the face recognition system 10 may be connected to the CCTV camera over a network in a wired or wireless way. For example, the network between the face recognition system 10 and the CCTV camera may include a wired network, such as Ethernet, a wired home network (power line communication), a telephone line communication device, or RS-serial communication, a wireless network, such as a mobile communication network, a wireless LAN (WLAN), Wi-Fi, Bluetooth, or ZigBee, or a combination of them.

The image 31 may be an image captured by the CCTV camera as in the above example, but may be an image captured by a digital camera, such as a camera built in a smartphone, according to circumstances.

The best shot detection apparatus 100 selects the best shot face image suitable for face recognition based on the image 31. The face recognition apparatus 200 performs the face recognition based on the best shot face image.

The best shot detection apparatus 100 includes the face image detection module 110 configured to detect a face image (may be referred to as 'facial area') in an input image, the quality element measurement module 120 configured to calculate quality element measurement values of the face image by analyzing the face image, and the best shot selection module 130 configured to select the best shot face image, among the detected face images, based on the quality element measurement value.

The face image detection module 110 detects and tracks a face image in an image received from a camera, such as a CCTV camera, and provides the detected face image to the quality element measurement module 120 and the best shot selection module 130.

The quality element measurement module 120 calculates a quality element measurement value of the detected face image by analyzing the detected face image. The quality element measurement module 120 may calculate a resolution value, focus element measurement value, pose element measurement value, and illumination element measurement value of the detected face image by measuring the qualities of a resolution element, focus element, pose element, and illumination element of the detected face image. A method of analyzing, by the quality element measurement module 120, a focus degree of the face image, that is, a method of calculating the focus element measurement value of the face image, may include various methods. The quality element measurement module 120 may calculate the focus element measurement value based on a high frequency component value of the face image. For example, the quality element measurement module 120 may determine the focus degree on the basis of a threshold value by calculating an average and standard deviation of high frequency component values of the face images through statistical experiments and determining the threshold value based on the calculated average and standard deviation. Furthermore, the quality element measurement module 120 may estimate a pose of the detected face image, and may calculate the pose element measurement value based on the results of the estimation of the pose. A method of estimating, by the quality element measurement module 120, a pose of a face image is various. For example, the quality element measurement module 120 may use any one of the existing model-based method and model-free method and a deep learning-based method that is recently used a lot or a combination of them. The quality element measurement module 120 may calculate the illumination element measurement value by analyzing an illumination distribution of the detected face image. For example, the quality element measurement module 120 may analyze an illumination distribution of a face image by using a histogram, and may calculate the illumination element measurement value. Furthermore, a method of calculating, by the quality element measurement module 120, resolution of the face image and comparing pieces of resolution of the face images may include various methods. The quality element measurement module 120 obtains a resolution value of the detected face image. The quality element measurement module 120 determines whether the detected face image has a size available for face recognition based on the resolution value.

The quality element measurement module 120 transmits the calculated quality element measurement value to the best shot selection module 130. In this case, the quality element measurement module 120 may transmit information on the matching of the quality element measurement value with a plurality of face images to the best shot selection module 130.

The best shot selection module 130 selects the best shot face image, among the detected face images, based on the quality element measurement values of the face image, which have been calculated by the quality element measurement module 120.

For example, the best shot selection module 130 may set reference values of measured quality elements (i.e., a focus element, a pose element, an illumination element, and a resolution element) of a detected face image, and may select the detected face image as the best shot face image when each of quality element measurement values of the detected face image is a set quality element reference value or higher. As another example, the best shot selection module 130 may apply a preset weight to each of the quality elements of a face image, may calculate a quality index by summing the quality element measurement values, and may select the face image as the best shot face image when the quality index satisfies a set quality index reference value.

The face recognition apparatus 200 receives the best shot face image from the best shot detection apparatus 100, and obtains the results of recognition by performing face recognition based on the best shot face image.

The function of each of the components of the best shot detection apparatus 100 is described below with reference to FIG. 2.

The face image detection module 110 detects and tracks a face image in an image, and provides the detected face image to the quality element measurement module 120 and the best shot selection module 130. The face image detection module 110 includes an image input unit 111 and a face detection unit 112.

The image input unit 111 receives the image 31 including a face, from the outside. For example, the image input unit 111 may receive the image 31 including a face from a CCTV camera in real time. Furthermore, the image 31 including the face may be a video image or may include a plurality of images. The image input unit 111 transmits the received image 31 to the face detection unit 112.

The face detection unit 112 generates a face image by detecting a facial area in the image 31. The face detection unit 112 may use a face detector, such as an AdaBoost (Adaptive Boost) classifier using Viola-Jones algorithm, or a face detector based on deep learning in detecting the facial area.

Furthermore, the face detection unit 112 continuously tracks the detected facial area in order to reduce a computational load and counteract an occlusion phenomenon. The face detection unit 112 may use a Kalman filter, a Particle filter, or a deep learning-based learning model in order to track the facial area. The face detection unit 112 may tag an identifier on the face image in order to identify a person. The face detection unit 112 may tag different identifiers on face images of a plurality of persons, and may tag the same identifier on a face image of the same person.

The face detection unit 112 transmits the detected face image to the quality element measurement module 120 and the best shot selection module 130. An identifier capable of identifying a face image of the same person may be tagged on the face image transmitted by the face detection unit 112.

The quality element measurement module 120 calculates the quality element measurement values of the face image by analyzing the face image. The quality element measurement module 120 includes a focus analysis unit 121, a pose analysis unit 122, an illumination analysis unit 123, and a resolution analysis unit 124.

When the face detection unit 112 generates a face image based on the image 31 that is photographed at a remote place, the face image includes very various problems, such as an illumination change and a pose change, along with problems, such as a bad focus, low resolution, an interlace, or a motion blur according to a movement of a user, because the face image has not been obtained in cooperation with the user. Accordingly, the quality of a detected face image may have a great influence on performance of the face recognition system 10. That is, in order to select a face image suitable for face recognition, a technology for analyzing the face image and measuring the quality of the face image is very important. The measurement of each of the quality elements of a detected face image may be independently performed.

The focus analysis unit 121 calculates the focus element measurement value based on the face image. The focus analysis unit 121 analyzes a high frequency component of an image by using a convolution kernel or a wavelet transform, and calculates the focus element measurement value, such as a value to determine whether a face image blurs, based on the results of the analysis.

The pose analysis unit 122 calculates the pose element measurement value based on the face image. The pose analysis unit 122 calculates the pose element measurement value by analyzing a degree that a facial area detected in the image 31 has approached a front face (i.e., a difference between the front face and three-dimensional angle, for example, a roll, a pitch, or a yaw) of the face image. The pose analysis unit 122 may use various analysis methods in order to analyze a pose of the face image. For example, the pose analysis unit 122 may use the model-based method or the model-free method, that is, the existing pose analysis method.

A detailed example of the model-based method which may be used by the pose analysis unit 122 includes a method using a model for representing an accurate structure and texture of a face, such as a 3D Morphable Model (3DMM), or a 3D Appearance Active Model (3D AAM), or a method of estimating a pose of a face by modeling an approximate structure of the face, such as a cylindrical, elliptical, or planar model.

Furthermore, the model-free method is a method of extracting feature points of a face and estimating a pose of the face by analyzing a distribution of the feature points.

Furthermore, the pose analysis unit 122 may use a method using a decision tree, such as Random Forest, or a method of analyzing a pose of a face by detecting the contour line of the face or major landmarks within the face, such as an eyebrows, eyes, a nose, a mouth, and a forehead that constitute the face, to analyze the pose of the face. Furthermore, the pose analysis unit 122 may use constrained local neural fields (CLNF) or a deep learning-based algorithm in order to detect the landmarks within the face.

The illumination analysis unit 123 calculates the illumination element measurement value based on the face image. The illumination analysis unit 123 may calculate a brightness distribution and average by analyzing the brightness of the face image. The illumination analysis unit 123 may calculate the illumination element measurement value by determining whether the entire brightness average is greater than an upper limit threshold value (i.e., too bright) or less than a lower limit threshold value (i.e., too dark) based on the results of the analysis of brightness of the face image. The illumination analysis unit 123 may perform a task, such as the measurement of brightness contrast and a brightness distribution (e.g., a distribution or a standard deviation), through histogram analysis for the face image.

The resolution analysis unit 124 obtains a resolution value (hereinafter may be referred to as a "resolution size") of a detected face image. The resolution analysis unit 124 determines whether the detected face image has a size available for recognition based on the detected face image. That is, the resolution analysis unit 124 determines whether the detected face image has a size available for face recognition based on the resolution value.

Each of the focus analysis unit 121, the pose analysis unit 122, the illumination analysis unit 123, and the resolution analysis unit 124 may convert the quality element measurement value (i.e., each of the focus element measurement value, the pose element measurement value, the illumination element measurement value, and the resolution value) so that the quality element measurement value has large-the-better-characteristics based on a difference between the quality element measurement value and a set target value when the quality element measurement value has nominal-the-best-characteristics.

The focus analysis unit 121, the pose analysis unit 122, the illumination analysis unit 123, and the resolution analysis unit 124 transmit the quality element measurement values (i.e., the focus element measurement value, the pose element measurement value, the illumination element measurement value, and the resolution value) of the face image to the best shot selection module 130.

The best shot selection module 130 selects the best shot face image, among the detected face images, based on the face image and the quality element measurement values thereof. The best shot selection module 130 includes a quality index calculation unit 131 and a best shot selection unit 132, and may further include a scheduling unit 133 and a best shot transmission unit 134.

The quality index calculation unit 131 calculates the quality index of a corresponding face image based on the quality element measurement values of the face image.

The quality index calculation unit 131 may have set permission ranges or reference values (i.e., a permission range/reference value of the resolution value, a focus element permission range/reference value, a pose element permission range/reference value, and an illumination element permission range/reference value) with respect to the measured quality elements (e.g., the resolution element, the focus element, the pose element, and the illumination element), respectively.

The quality index calculation unit 131 may perform a function for setting a threshold value (or a reference value) for determining whether each of the quality elements is a pass, setting a weight for each of the quality elements, and defining a threshold value (or a quality index reference value), that is, the sum of the weights. The quality element reference value or the quality index reference value may be different depending on an installation environment and object of a system. For example, when illumination at the place where a CCTV camera has been installed is good, an illumination element reference value or a quality index reference value may be set to be high.

The quality index calculation unit 131 may adjust the permission range or reference value of each of the quality elements or the permission range or reference value of the quality index previously or in real time based on the quality element measurement values of a plurality of face images that are detected in the FoV of a CCTV camera so that the permission range or the reference value is matched with an environment. For example, when a brightness average of a face image is high, the quality index calculation unit 131 may adjust the illumination element permission range or raise the illumination element reference value.

A method of calculating, by the quality index calculation unit 131, the quality index of a face image based on the quality element measurement values of the face image may include various methods. For example, the quality index calculation unit 131 may calculate a resolution quality index, a focus element quality index, a pose element quality index, and an illumination element quality index, based on the resolution value, the focus element measurement value, the pose element measurement value, and the illumination element measurement value, respectively. In this case, the quality index calculation unit 131 may convert each quality element measurement value into a quality index having large-the-better-characteristics. As another example, the quality index calculation unit 131 may determine a case in which each quality element measurement value of a detected face image is a reference value or higher to be 1 point, may determine a case in which each quality element measurement value of a detected face image is less than the reference value to be 0 point, and may calculate a total quality index by summing all of the quality elements. Assuming that the quality elements include the four types of resolution element, focus element, pose element, and illumination element, the quality index calculation unit 131 may assign a quality index of 4 point to a face image when each of the quality element measurement values of all of the quality elements of the face image is a set reference value or higher. Furthermore, as another example, the quality index calculation unit 131 may apply a preset weight to each of the quality elements, and may calculate a total quality index by weight-summing the quality element measurement values. For example, assuming that the quality elements include the four types of resolution element, focus element, pose element, and illumination element, the quality index calculation unit 131 may apply a weight 1 to the resolution, a weight 2 to the focus element, a weight 3 to the pose element, and a weight 1 to the illumination element, and may calculate a total quality index by weight-summing the quality element measurement values.

The quality index calculation unit 131 transmits the quality index of the face image to the best shot selection unit 132. Furthermore, the quality index calculation unit 131 may transmit a quality index reference value or permission range to the best shot selection unit 132.

The best shot selection unit 132 selects the best shot face image, among detected face images, based on a face image and quality indices thereof. The best shot selection unit 132 evaluates whether a detected face image satisfies a criterion defined by the quality index calculation unit 131, and selects a case in which the defined criterion is satisfied as the best shot face image. For example, the best shot selection unit 132 selects a face image as the best shot face image when the quality index of the face image is equal to or greater than a quality index reference value.

The scheduling unit 133 may adjust the number or transmission sequence of best shot face images to be transmitted to the face recognition apparatus 200. For example, when a plurality of best shot face images is selected or the best shot face image is not selected in the FoV of a camera with respect to the same person, the scheduling unit 133 may adjust the number of best shot face images to be transmitted to the face recognition apparatus 200. For example, when the best shot selection unit 132 selects a plurality of best shot face images of the same person, the scheduling unit 133 may determine only one sheet of the best shot face image as a transmission target image based on the quality index of the face image. Furthermore, as another example, when the best shot face image of the same person is not selected, the scheduling unit 133 may control the best shot selection unit 132 to select a face image having the highest quality index, among detected face images each having a quality index less than a reference value, as the best shot face image.

The best shot transmission unit 134 transmits the best shot face image to the face recognition apparatus 200. At this time, the communication module 210 of the face recognition apparatus 200 receives the best shot face image. The face recognition module 220 performs a required face recognition function by the best shot face image. The face recognition module 220 may search the best shot face image for feature points (e.g., eyes, a nose, lips, and a jawline), may change the structure of the best shot face image in order to compare the best shot face image with an image that has been previously stored in an internal repository (DB), may calculate the similarity probability between the best shot face image and the previously stored image by comparing the best shot face image and the previously stored image based on the retrieved feature points, and may recognize the face based on the similarity probability.

The detection of a face by an artificial intelligence (AI) CCTV camera may be performed by an AI module embedded in the AI CCTV camera. A function for measuring the quality elements of a face image and selecting the best shot face image may also be performed by the AI module. That is, the best shot detection apparatus 100 according to an embodiment of the present disclosure may be included in the AI CCTV camera.

A common CCTV camera transmits all images to a server. An AI module included in the server performs a process of detecting a face image based on all of the images, measuring the quality elements of the face image, and selecting the best shot face image.

The roles of the face recognition system may be properly distributed and performed depending on a function and performance of the AI module. For example, a portion that requires the greatest computing resources is to detect a face. Accordingly, the AI CCTV camera performs the detection of the face up to the selection of the best shot face image. In this case, the best shot detection apparatus 100 is included in the AI CCTV camera. Furthermore, the AI CCTV camera limitedly transmits the best shot face image to a face recognition server (i.e., the face recognition apparatus 200) in order to maximize efficiency of the face recognition system 10.

Figure 3:
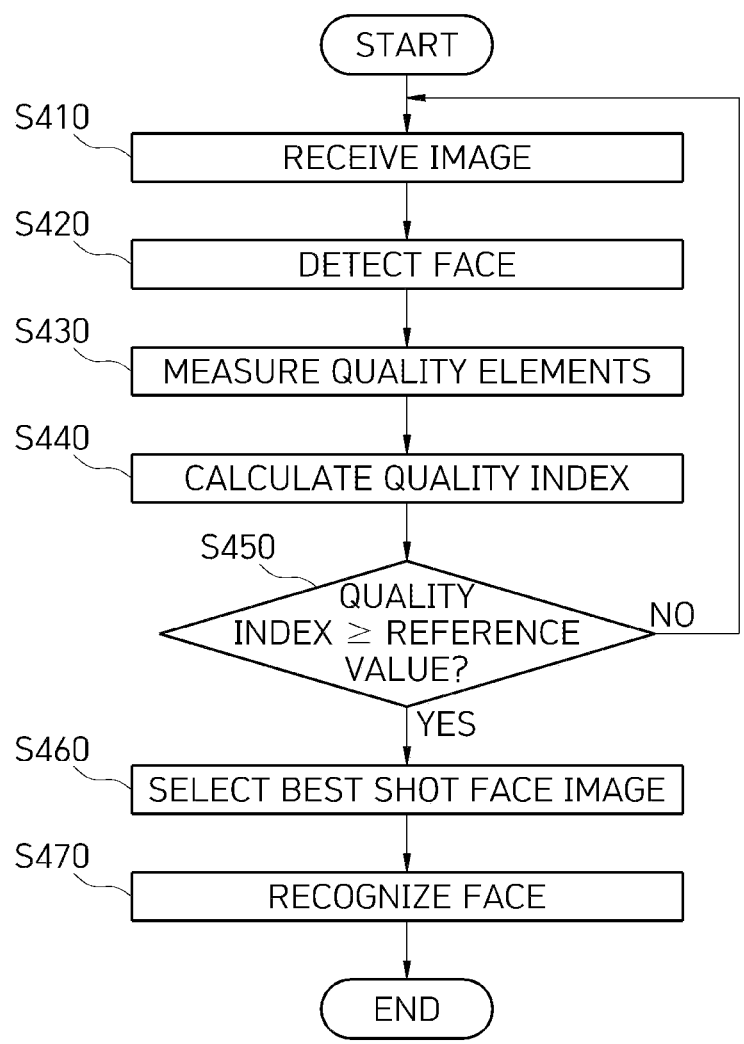
FIG. 3 is a flowchart for describing a method of detecting the best shot according to an embodiment of the present disclosure.

FIG. 3 is a flowchart for describing a method of detecting the best shot according to an embodiment of the present disclosure. The method of detecting the best shot according to an embodiment of the present disclosure may be used to detect a face and measure quality elements of the face at a remote place in a CCTV camera environment. The method of detecting the best shot according to an embodiment of the present disclosure may be performed by the face recognition system 10. For convenience of description, it is a prerequisite that the method of detecting the best shot according to an embodiment of the present disclosure is performed by the face recognition system 10.

The method of detecting the best shot according to an embodiment of the present disclosure may include steps S410 to S460, and may further include step S470.

Step S410 is an image input step. The face recognition system 10 receives the image 31 including a face in order to detect the best shot face image. For example, the face recognition system 10 may receive the video image 31, including a face, from a CCTV camera.

Step S420 is a face detection step. The face recognition system 10 generates a face image by detecting a facial area in the image 31. In detecting the facial area, the face recognition system 10 may use a face detector, such as the AdaBoost (Adaptive Boost) classifier using Viola-Jones algorithm, or a deep learning-based face detector.

Furthermore, the face recognition system 10 continuously tracks the detected facial area in order to reduce a computational load and counteract an occlusion phenomenon. The face recognition system 10 may use the Kalman filter, the particle filter, or the deep learning-based learning model in order to track the facial area. The face recognition system 10 may tag an identifier on the face image in order to identify a person. The face recognition system 10 may tag different identifiers on face images of a plurality of persons, and may tag the same identifier on a face image of the same person.

The face recognition system 10 verifies the detected face image and then uses the verified face image to measure the quality elements of the face image.

Step S430 is a quality element measurement step. The face recognition system 10 calculates the quality element measurement values of the detected face image by analyzing the detected face image. The face recognition system 10 may calculate the resolution value, focus element measurement value, pose element measurement value, and illumination element measurement value of the detected face image by measuring the qualities of a resolution element, focus element, pose element, and illumination element of the face image, respectively. The measurements of the quality elements of the detected face image may be independently performed.

A method of analyzing, by the face recognition system 10, a focus degree of the face image, that is, a method of calculating, by the face recognition system 10, the focus element measurement values may include various methods. The face recognition system 10 may calculate the focus element measurement value based on a high frequency component value of the face image. The face recognition system 10 may analyze the high frequency component of the face image by using a convolution kernel or a wavelet transform, and may calculate the focus element measurement value, such as a value to determine whether the face image blurs, based on the results of the analysis. Furthermore, the face recognition system 10 may calculate an average and standard deviation of high frequency component values of the face image through statistical experiments, may determine a threshold value for the face image based on the average and standard deviation, and may determine the focus degree on the basis of the threshold value.

Furthermore, the face recognition system 10 may estimate a pose of the detected face image and calculate the pose element measurement value based on the results of the estimation of the pose. The face recognition system 10 calculates the pose element measurement value by analyzing a degree that the facial area detected in the image 31 has approached a front face (i.e., a difference between the front face and three-dimensional angle of the face image, for example, a roll, a pitch, or a yaw) of the face image. A method of estimating, by the face recognition system 10, the pose of the face image is various. For example, the face recognition system 10 may use any one of the existing model-based method and model-free method and a deep learning-based method that is recently used a lot, or a combination of them. Examples of the method which may be used for the face recognition system 10 to estimate the pose of the face image have been described in the description relating to the pose analysis unit 122.

The face recognition system 10 may calculate the illumination element measurement value by analyzing an illumination distribution of the detected face image. For example, the face recognition system 10 may analyze the illumination distribution of the face image by using a histogram, and may calculate the illumination element measurement value. Examples of a method which may be used for the face recognition system 10 to measure the illumination elements of the face image have been described in the description relating to the illumination analysis unit 123.

When the quality element measurement value (e.g., the resolution value, the focus element measurement value, the pose element measurement value, or the illumination element measurement value) has nominal-the-best-characteristics, the face recognition system 10 may convert the quality element measurement value so that the quality element measurement value has large-the-better-characteristics based on a difference between the quality element measurement value and a set target value.

Step S440 is a quality index calculation step. The face recognition system 10 calculates a quality index of the face image based on the quality element measurement values of the face image.

A method of calculating, by the face recognition system 10, the quality index of the face image based on the quality element measurement values of the face image may include various methods. For example, the face recognition system 10 may calculate a resolution quality index, a focus element quality index, a pose element quality index, and an illumination element quality index, based on the resolution value, the focus element measurement value, the pose element measurement value, and the illumination element measurement value, respectively. In this case, the face recognition system 10 may convert each quality element measurement value into a quality index having large-the-better-characteristics. As another example, the face recognition system 10 may determine a case in which each quality element measurement value of a detected face image is a reference value or higher to be 1 point, may determine a case in which each quality element measurement value of a detected face image is less than the reference value to be 0 point, and may calculate a total quality index by summing all of the quality elements. Assuming that the quality elements include the four types of resolution element, focus element, pose element, and illumination element, the face recognition system 10 may assign a quality index of 4 point to a face image when each of the quality element measurement values of all of the quality elements of the face image is a set reference value or higher. Furthermore, as another example, the face recognition system 10 may apply a preset weight to each of the quality elements, and may calculate a total quality index by weight-summing the quality element measurement values. For example, assuming that the quality elements include the four types of resolution element, focus element, pose element, and illumination element, the face recognition system 10 may apply a weight 1 to the resolution, a weight 2 to the focus element, a weight 3 to the pose element, and a weight 1 to the illumination element, and may calculate a total quality index by weight-summing the quality element measurement values.

Step S450 is a step of determining whether the quality index is equal to or greater than a quality index reference value. The face recognition system 10 may determine whether the quality index of each quality element satisfies the reference value of each preset quality element in order to select the best shot face image, and may determine whether a total quality index is equal to or greater than the reference value of the total quality index.

The face recognition system 10 repeatedly performs the processes from the step of receiving a CCTV input image again when the quality index does not satisfy the criterion for the best shot, and performs face recognition based on the best shot face image when the quality index satisfies the criterion for the best shot. That is, the face recognition system 10 performs step S460 when each of all of the quality indices of the quality elements is equal to or greater than each of the reference values or the total quality index is equal to or greater than the reference value or higher in step S450, and performs step S410 when each of all of the quality indices of the quality elements is not equal to or greater than each of the reference values or the total quality index is not equal to or greater than the reference value or higher in step S450.

Step S460 is a step of selecting the best shot face image. The best shot detection apparatus 100 of the face recognition system 10 selects the best shot face image, among the face images, based on the face image and the quality indices thereof. The best shot detection apparatus 100 of the face recognition system 10 may be physically separated from the face recognition apparatus 200 of the face recognition system 10. In this case, the best shot detection apparatus 100 transmits the best shot face image to the face recognition apparatus 200 over a wired or wireless network. In this case, if several sheets of best shot face images are continuously selected with respect to a detected/tracked face image, the best shot detection apparatus 100 may limit the number of best shot face images that are transmitted. Furthermore, if the best shot face image is not selected when a corresponding person deviates from the FoV of the CCTV camera, the best shot detection apparatus 100 transmits one face image having the highest quality index, among detected face images, to the face recognition apparatus 200 for face recognition.

Step S470 is a face recognition step. The face recognition apparatus 200 of the face recognition system 10 performs a required face recognition function by using the best shot face image. The face recognition apparatus 200 may search the best shot face image for feature points (e.g., eyes, a nose, lips, and a jawline), may change the structure (e.g., up and down and left and right angles) of the best shot face image in order to compare the best shot face image with an image that has been previously stored in an internal repository (DB), may calculate the similarity probability between the best shot face image and the previously stored image by comparing the best shot face image and the previously stored image based on the retrieved feature points, and may recognize the face based on the similarity probability.

The method of detecting the best shot has been described with reference to the flowcharts presented in the drawings. For a simple description, the method has been illustrated and described as a series of blocks, but the present disclosure is not limited to the sequence of the blocks, and some blocks may be performed in a sequence different from that of or simultaneously with that of other blocks, which has been illustrated and described in this specification. Various other branches, flow paths, and sequences of blocks which achieve the same or similar results may be implemented. Furthermore, all the blocks illustrated in order to implement the method described in this specification may not be required.

In the description given with reference to FIG. 3, each of the steps may be further divided into additional steps or the steps may be combined into smaller steps depending on an implementation example of the present disclosure. Furthermore, some of the steps may be omitted, if necessary, and the sequence of the steps may be changed. Furthermore, although contents are omitted, the contents of FIGS. 1 and 2 may be applied to the contents of FIG. 3. Furthermore, the contents of FIG. 3 may be applied to the contents of FIGS. 1 and 2.

Figure 4:
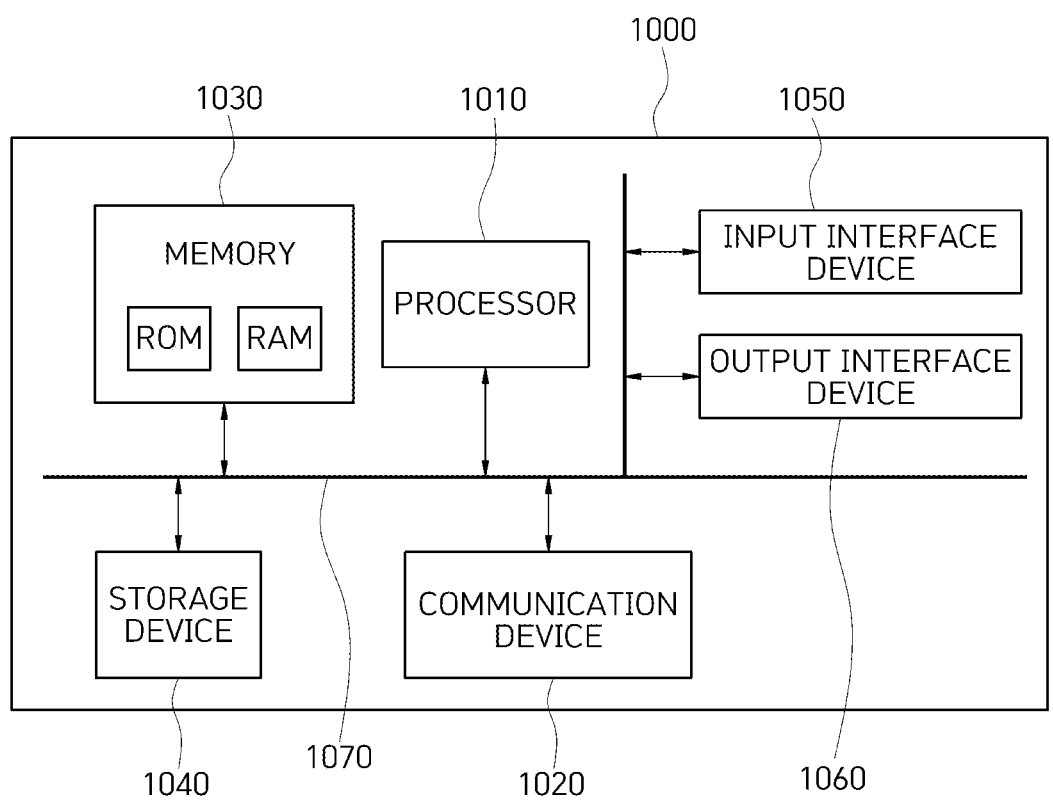
FIG. 4 is a block diagram illustrating a computer system for implementing the method of detecting the best shot according to an embodiment of the present disclosure.

FIG. 4 is a block diagram illustrating a computer system for implementing the method of detecting the best shot according to an embodiment of the present disclosure. The apparatus 100 for detecting the best shot may have the same physical components as the computer system illustrated in FIG. 4.

Referring to FIG. 4, a computer system 1000 may include at least one of a processor 1010, memory 1030, an input interface device 1050, an output interface device 1060, and a storage device 1040 which communicate with each other through a bus 1070. The computer system 1000 may further include a communication device 1020 connected to a network. The processor 1010 may be a central processing unit (CPU) or may be a semiconductor device that executes instructions stored in the memory 1030 or the storage device 1040. The memory 1030 and the storage device 1040 may include various types of volatile or nonvolatile storage media. For example, the memory may include read only memory (ROM) and random access memory (RAM). In an embodiment of the present specification, the memory may be disposed inside or outside the processor, and may be connected to the processor through various known means. The memory includes various types of volatile or nonvolatile storage media, and may include read-only memory (ROM) or random access memory (RAM), for example.

Accordingly, an embodiment of the present disclosure may be implemented as a method implemented in a computer or may be implemented as a non-transitory computer-readable medium in which a computer-executable instruction has been stored. In an embodiment, when being executed by a processor, a computer-readable instruction may perform a method according to at least one aspect of this writing.

The communication device 1020 may transmit or receive a wired signal or a wireless signal.

Furthermore, the method according to an embodiment of the present disclosure may be implemented in the form of a program instruction which may be executed through various computer means, and may be recorded on a computer-readable medium.

The computer-readable medium may include a program instruction, a data file, and a data structure alone or in combination. A program instruction recorded on the computer-readable medium may be specially designed and constructed for an embodiment of the present disclosure or may be known and available to those skilled in the computer software field. The computer-readable medium may include a hardware device configured to store and execute the program instruction. For example, the computer-readable medium may include magnetic media such as a hard disk, a floppy disk, and a magnetic tape, optical media such as CD-ROM and a DVD, magneto-optical media such as a floptical disk, ROM, RAM, and flash memory. The program instruction may include not only a machine code produced by a compiler, but a high-level language code capable of being executed by a computer through an interpreter.

For reference, the components according to an embodiment of the present disclosure may be implemented in the form of software or hardware, such as a digital signal processor (DSP), a field programmable gate array (FPGA), or an application specific integrated circuit (ASIC), and may perform predetermined roles.

However, the "components" are not components having meanings limited to software or hardware, and each component may be configured to reside on an addressable storage medium and may be configured to operate one or more processors.

Accordingly, for example, the component may include components, such as software components, object-oriented software components, class components, and task components, processes, functions, attributes, procedures, sub-routines, segments of a program code, drivers, firmware, a microcode, circuitry, data, a database, data structures, tables, arrays, and variables.

Components and functions provided in corresponding components may be combined into fewer components or may be further separated into additional components.

It will be understood that each block of the flowcharts and combinations of the blocks in the flowcharts may be executed by computer program instructions. These computer program instructions may be mounted on the processor of a general purpose computer, a special purpose computer, or other programmable data processing equipment, so that the instructions executed by the processor of the computer or other programmable data processing equipment create means for executing the functions specified in the flowchart block(s). The computer program instructions may also be loaded on a computer or other programmable data processing equipment to cause a series of operational steps to be performed on the computer or other programmable data processing equipment to produce a computer-executed process, so that the instructions executing the computer or other programmable data processing equipment provide steps for executing the functions described in the flowchart block(s).

Furthermore, each block of the flowcharts may represent a portion of a module, a segment, or code, which includes one or more executable instructions for executing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

The term " . . . unit" or " . . . module" used in the present embodiment means a software component or a hardware component, such as an FPGA or an ASIC, and the " . . . unit" or " . . . module" performs specific tasks. However, the term " . . . unit" or " . . . module" does not mean that it is limited to software or hardware. The " . . . unit" or " . . . module" may be configured to reside on an addressable storage medium and configured to operate one or more processors. Accordingly, examples of the " . . . unit" or " . . . module" may include components, such as software components, object-oriented software components, class components, and task components, processes, functions, attributes, procedures, sub-routines, segments of a program code, drivers, firmware, a microcode, circuitry, data, a database, data structures, tables, arrays, and variables. The functionalities provided in the components and the " . . . units" or " . . . modules" may be combined into fewer components and " . . . units" or " . . . modules", or may be further separated into additional components and " . . . units" or " . . . modules". Furthermore, the components and the " . . . units" or " . . . modules" may be implemented to operate one or more CPUs within a device or a security multimedia card.

The constructions of the present disclosure have been described in detail above with reference to the accompanying drawings, but are merely illustrative. A person having ordinary knowledge in the art to which the present disclosure pertains will understand that various modifications and changes are possible without departing from the technical spirit of the present disclosure. Accordingly, the scope of the present disclosure is defined by the appended claims rather than by the detailed description, and all changes or modifications derived from the scope of the claims and equivalents thereto should be interpreted as being included in the technical scope of the present disclosure.

DESCRIPTION OF REFERENCE NUMERAL

| | |
|---|---|
| 10: face recognition system | 31: image |
| 110: face image detection module | |
| 111: image input unit | 112: face detection unit |
| 120: quality element measurement module | |
| 121: focus analysis unit | |
| 122: pose analysis unit | |
| 123: illumination analysis unit | |
| 124: resolution analysis unit | |
| 130: best shot selection module | |
| 131: quality index calculation unit | |
| 132: best shot selection unit | |
| 133: scheduling unit | |
| 134: best shot transmission unit | |
| 200: face recognition apparatus | |
| 210: communication module | |
| 220: face recognition module | |
| 1000: computer system | 1010: processor |
| 1020: communication device | 1030: memory |
| 1040: storage device | |
| 1050: input interface device | |
| 1060: output interface device | 1070: bus |

What is claimed is:

1. A best shot detection apparatus, comprising:
a face image detection module configured to detect facial areas in an image;
a quality element measurement module configured to calculate quality element measurement values of the detected facial areas by analyzing the detected facial areas; and
a best shot selection module configured to select best shot face images, among the detected facial areas, based on the quality element measurement values,
wherein the quality element measurement values comprise a combination of a resolution value, a focus element measurement value, a pose element measurement value, and an illumination element measurement value,
wherein the quality element measurement module calculates the focus element measurement value by analyzing a high frequency component of the facial area using wavelet transform,
wherein the quality element measurement module calculates the pose element measurement value by analyzing a difference between a front face and three-dimensional angle of the facial area using any one of a 3D Morphable Model (3DMM) and a 3D Appearance Active Model (3D AAM),
wherein the best shot selection module calculates quality indexes of the detected facial areas based on the quality element measurement values and selects the best shot face images, among the detected facial areas based on the quality indexes, and transmits the best shot face image to a face recognition apparatus,
wherein the best shot selection module limits the number of images to be sent to the face recognition apparatus based on the number of the best shot face images.

2. The best shot detection apparatus of claim 1, wherein the best shot selection module determines whether to transmit the best shot face images to the face recognition apparatus based on the quality indexes of the best shot face images.

3. The best shot detection apparatus of claim 1, wherein the quality element measurement module calculates the illumination element measurement value through an analysis of a brightness histogram of the facial area.

4. A face recognition system, comprising:
the best shot detection apparatus according to claim 1; and
the face recognition apparatus configured to perform face recognition based on the best shot face images.

5. A method of detecting a best shot, comprising:
detecting face images in an image received from an outside;
calculating quality element measurement values of the detected face images by analyzing the detected face images; and
selecting the best shot face images, among the detected face images, based on the quality element measurement value,
wherein the quality element measurement values comprise a combination of a resolution value, a focus element measurement value, a pose element measurement value, and an illumination element measurement value,
wherein the calculating of the quality element measurement values comprises calculating the focus element measurement value by analyzing a high frequency component of the face image using wavelet transform,
wherein the calculating of the quality element measurement values comprises calculating the pose element measurement value by analyzing a difference between a front face and three-dimensional angle of the face image using any one of a 3D Morphable Model (3DMM) and a 3D Appearance Active Model (3D AAM),
wherein the selecting the best shot images comprises calculating quality indexes of the detected facial areas based on the quality element measurement values and selects the best shot face images, among the detected face images based on the quality indexes, and transmits the best shot face images to a face recognition apparatus,
wherein the selecting the best shot images comprises limiting the number of images to be sent to the face recognition apparatus based on the number of the best shot face images.

6. The method of claim 5, wherein the selecting of the best shot face images comprises determining whether to transmit the best shot face images to the face recognition apparatus based on the quality indexes of the best shot face images.

7. The method of claim 5, wherein the calculating of the quality element measurement values comprises calculating the illumination element measurement value by analyzing a brightness histogram of the face image.

8. The method of claim 5, wherein the detecting of the face image comprises:
generating the detected face images by detecting facial areas in the image received from the outside, and
identifying the detected face images of an identical person based on results of a tracking of the facial area detected in a video image when the image received from the outside is the video image.

* * * * *